United States Patent
Chung et al.

(10) Patent No.: US 6,938,606 B2
(45) Date of Patent: Sep. 6, 2005

(54) SYSTEM AND METHOD FOR IMPROVED ENGINE POSITION SENSING

(75) Inventors: Jae Doo Chung, Westland, MI (US); Arthur Joseph Varady, Chelsea, MI (US); Marsha Wendel, New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 12 days.

(21) Appl. No.: 10/605,285

(22) Filed: Sep. 19, 2003

(65) Prior Publication Data

US 2005/0061293 A1 Mar. 24, 2005

(51) Int. Cl.⁷ ............................................... F02B 75/12
(52) U.S. Cl. ............................................... 123/198 DB
(58) Field of Search .................... 123/198 DB, 198 DC, 123/179.3, 179.4

(56) References Cited

U.S. PATENT DOCUMENTS

| | | |
|---|---|---|
| 5,117,681 A | 6/1992 | Dosdall et al. |
| 5,377,536 A | 1/1995 | Angermaier et al. |
| 6,073,713 A | 6/2000 | Brandenburg et al. |
| 6,425,365 B1 * | 7/2002 | Peters et al. .......... 123/198 DB |
| 6,453,864 B1 * | 9/2002 | Downs et al. ........... 123/179.3 |
| 6,763,298 B2 * | 7/2004 | Boggs et al. ................ 701/112 |

* cited by examiner

Primary Examiner—Henry C. Yuen
Assistant Examiner—Hyder Ali
(74) Attorney, Agent, or Firm—Brooks Kushman P.C.; Carlos Hanze

(57) ABSTRACT

A method is provided for controlling an engine in a vehicle to facilitate determination of engine position sensor correction factors. The vehicle includes a motor, which is operatively connected to the engine, a sensor configured to detect engine position, and a controller, which is in communication with the engine, the sensor and the motor. It is determined when an engine shutdown is requested, for example, when the controller commands the vehicle to be powered by the motor. It is next determined whether engine position sensor correction factors are known. If they are, the engine control routine is stopped. If the correction factors are not known, fuel to the engine is discontinued, and the motor is employed to spin the engine at an approximately constant speed. The engine position sensor correction factors can then be determined while the engine is rotating in a defueled state.

23 Claims, 2 Drawing Sheets

SYSTEM AND METHOD FOR IMPROVED ENGINE POSITION SENSING

BACKGROUND OF INVENTION

1. Field of the Invention

The present invention relates to a system and method for controlling an engine to facilitate the determination of engine position sensor correction factors.

2. Background Art

The detection of misfires in an internal combustion engine is important for a number of reasons, including fuel economy. When the fuel-air mixture within one or more cylinders fails to ignite, the engine may experience a measurable loss of power. This loss of power, and thus the misfires, can be detected by measuring changes in the velocity of the engine crankshaft. The velocity of the crankshaft can be calculated by measuring the change in the angular position of the crankshaft over a known period of time. The accuracy of the crankshaft velocity, therefore, depends on a number of things, including an accurate measurement of changes in the angular position of the crankshaft.

To measure the angular position of an engine, a variety of devices may be employed. For example, an encoder wheel having teeth or slots may interact with magnetic or optical sensors at predetermined points in the rotation of the engine crankshaft. Inherent in any such measurement device is a certain amount of inaccuracy. In order to accurately determine the engine's angular position, and thus the engine velocity, adjustments must be made to compensate for inaccuracies in the measurements obtained from these devices. In order to determine an appropriate correction factor for a position sensor measurement in an engine, it may be desirable to perform position measurements with engine combustion inhibited. This is because most non-uniformity of engine rotation during normal engine operation is caused by combustion events. A method for "Correction of Systematic Position-Sensing Errors in Internal Combustion Engines" is described in U.S. Pat. No. 5,117,681 issued to Dosdall, et al. on Jun. 2, 1992, which is incorporated herein by reference.

Although many vehicles today are still powered exclusively by an internal combustion engine, hybrid vehicles are becoming increasingly popular. For example, a hybrid electric vehicle (HEV) may include one or more electric motors that can be used to augment an engine to provide power to the vehicle wheels. In such hybrid vehicles, misfire detection, and therefore accurate determination of engine velocity and position, is still important. Therefore, measuring engine position with combustion inhibited—i.e., when fuel is discontinued to the engine—is still desirable for determining correction factors to be applied to the engine position sensor. On a vehicle driven only by an internal combustion engine, a defueled condition occurs during decelerations, which can be initiated by a decrease in driver demand as indicated by the accelerator pedal. On an HEV, however, a decrease in driver demand does not necessarily cause a defueled condition. Therefore, a need exists for controlling an engine in a hybrid electric vehicle to facilitate determination of engine position sensor correction factors.

SUMMARY OF INVENTION

Accordingly, the invention provides a method for controlling an engine in a vehicle having a motor operatively connected to the engine. The method includes determining when an engine shutdown is requested. It is then determined whether an engine position sensor correction factor is known. Fuel to the engine is discontinued if the engine position sensor correction factor is not known and an engine shutdown in requested. The motor is employed to spin the engine after fuel to the engine is discontinued, which facilitates determination of the engine position sensor correction factor.

The invention also provides a system for controlling an engine in a vehicle to facilitate determination of engine position sensor correction factors. The vehicle includes a motor operatively connected to the engine. The system includes a sensor configured to cooperate with the engine to detect engine position. The system also includes a controller in communication with the engine, the sensor, and the motor. The controller is configured to command an engine shutdown, and to determine whether the engine position sensor correction factors are known. The controller is further configured to discontinue fuel to the engine after engine shutdown is commanded and the engine position correction factors are not known. The controller commands the motor to spin the engine after fuel to the engine is discontinued, thereby facilitating determination of the engine position sensor correction factors.

The invention further provides a vehicle having a system for controlling an engine to facilitate determination of engine position sensor correction factors. The vehicle includes an engine, a motor operatively connected to the engine, and a sensor configured to cooperate with the engine to detect engine position. The vehicle further includes a controller in communication with the engine, the sensor, and the motor. The controller is configured to command an engine shutdown, and determine whether the engine position sensor correction factors are known. The controller discontinues fuel to the engine after engine shutdown is commanded and the engine position correction factors are not known. The controller is further configured to command the motor to spin the engine after fuel to the engine is discontinued, thereby facilitating determination of the engine position sensor correction factors.

DETAILED DESCRIPTION

Figure 1:
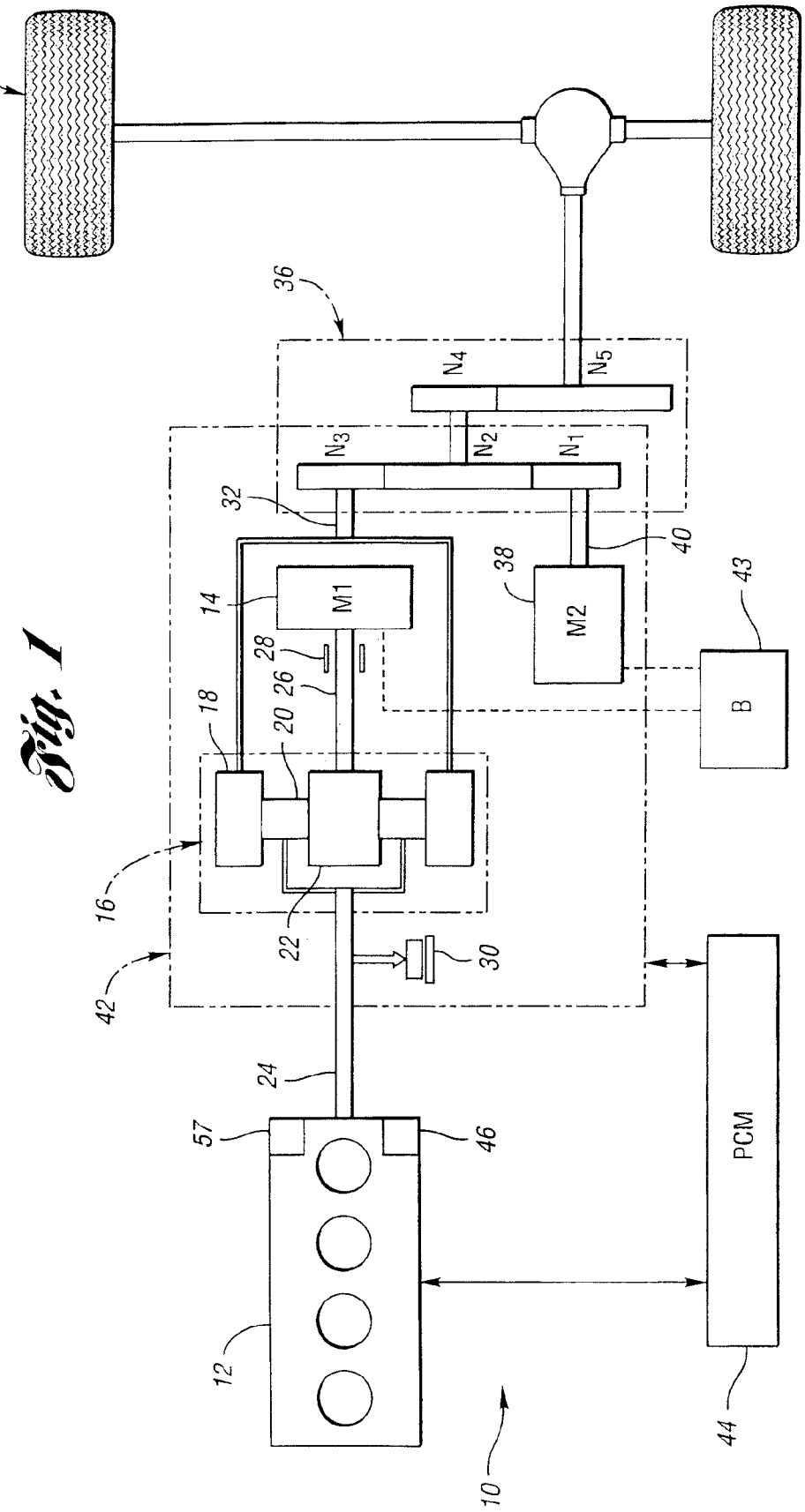
FIG. 1 is a schematic representation of a portion of a vehicle including a system in accordance with the present invention.

FIG. 1 shows a schematic representation of a system 10 in accordance with the present invention. A vehicle, not shown in its entirety, includes an engine 12 and a motor 14. The engine 12 and the motor 14 are connected through a power transfer unit, which in this embodiment is a planetary gear set 16. Of course, other types of power transfer units, including other gear sets and transmissions may be used to connect the engine 12 to the motor 14. The planetary gear set 16 includes a ring gear 18, a carrier 20, and a sun gear 22. An engine shaft 24 is connected to the carrier 20, while a motor shaft 26 is connected to the sun gear 22. A motor brake 28 is provided for stopping rotation of the motor shaft 26, thereby locking the sun gear 22 in place. Because this configuration allows torque to be transferred from the motor 14 to the engine 12, a one-way clutch 30 is provided so that the engine shaft 24 rotates in only one direction.

The ring gear 18 is connected to a shaft 32, which is connected to vehicle wheels 34 through a second gear set 36. The vehicle includes a second motor 38, which is connected to the vehicle wheels 34 through a motor shaft 40 and the second gear set 36. As seen in FIG. 1, the motors 14, 38, the planetary gear set 16, and a portion of the second gear set 36 may generally be referred to as a transaxle 42. The motors 14, 38 are connected to a battery 43 which provides electrical power to run them. Alternatively, one or both of the motors 14, 38 could act as a generator, which is used to charge the battery 43 when the vehicle is in a regenerative mode. The vehicle architecture shown in FIG. 1 is but one of many different architectures that can be used with the system 10.

For example, as mentioned above, the planetary gear set 16 could be replaced with different types of power transfer units. In addition, a disconnect clutch could be placed on the engine shaft 24 to allow a mechanical disconnection of the engine output from the vehicle wheels 34. Moreover, different types of electrical output devices, such as a fuel cell or an ultra-capacitor may be used in place of, or in connection with, a battery.

A controller, or powertrain control module (PCM) 44 is provided for controlling the engine 12 and the motors 14, 38. Although shown as a single unit, the PCM 44 may be made up of more than one controller. For example, such controllers may be separate hardware devices, or separate software controllers, such as a transaxle control module (TCM) configured to control the transaxle 42. As explained more fully below, the PCM 44 communicates with a sensor 46, which is configured to detect the rotational position of the engine 12.

The sensor 46 may be any one of number of different types of devices capable of measuring the angular position of the engine 12. For example, the sensor 46 may be a device that includes a rotor attached to the engine crankshaft (not visible in FIG. 1) that has a number of vanes, teeth, or slots disposed thereon for interacting with magnetic or optical sensors at predetermined points in the rotation of the crankshaft. The sensor 46 communicates information regarding the angular position of the engine crankshaft with the PCM 44. The PCM 44 can use the information communicated from the sensor 46 to perform a number of different functions. For example, as the angular position of the crankshaft is measured over time, the angular velocity of the crankshaft can be calculated. The accuracy of the velocity calculation depends on a number of things, including the accuracy of the angular position measurement and the accuracy of the time measurement. Measurement of angular position by a sensor, such as the sensor 46, will inherently have some inaccuracy. To compensate, correction factors can be determined to reduce or eliminate the position measurement inaccuracies.

As briefly mentioned above, it may be desirable to determine engine position sensor correction factors with combustion in the engine inhibited. Such a state is easily achieved in a vehicle driven only by an internal combustion engine, since a defueled condition occurs during decelerations initiated by a decrease in driver demand. On a hybrid electric vehicle, however, a decrease in driver demand does not necessarily cause a defueled condition. Therefore, the present invention provides a method for controlling an engine, such as the engine 12 shown in FIG. 1, to facilitate determination of engine position sensor correction factors.

Figure 2:
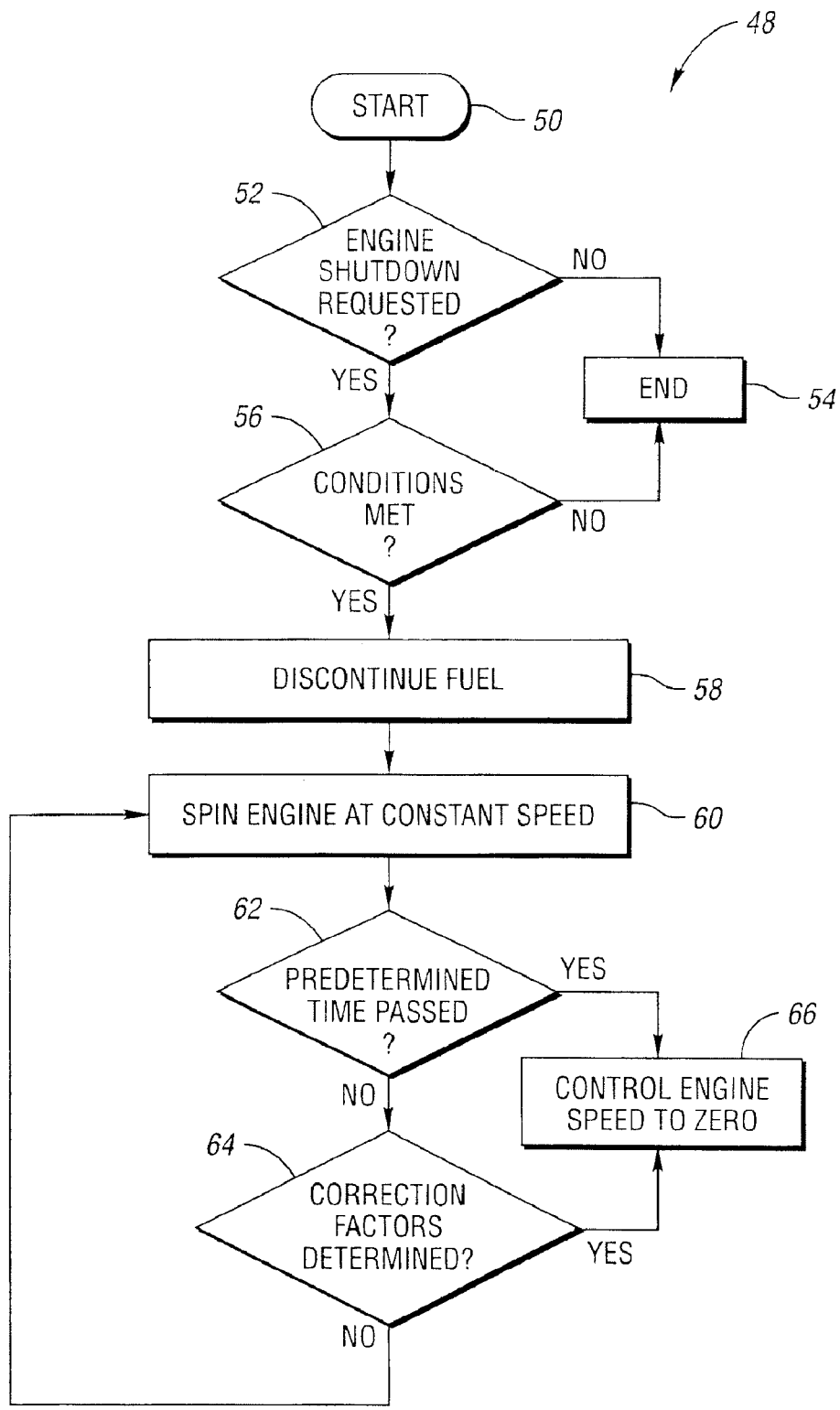
FIG. 2 is a flow chart illustrating a method in accordance with the present invention.

FIG. 2 shows a flow chart 48 illustrating a method, or engine control routine, for controlling an engine in accordance with the present invention. When the method begins, see block 50, the first step is to determine whether an engine shutdown has been requested, see step 52. In a hybrid electric vehicle, such as the vehicle illustrated in FIG. 1, such a shutdown request can come from a controller, such as the PCM 44, or it may be initiated by a vehicle operator. For example, if the PCM 44 receives signals indicating that driver demand for power to the vehicle wheels 34 is low, the PCM 44 may command shutdown of the engine 12 while the vehicle is still operating. In this state, one or both of the motors 14, 38 may be used to provide power to drive the vehicle wheels 34.

It is worth noting that an engine shutdown may not always be commanded each time the engine is not required to drive the vehicle wheels. For example, the engine 12 may be required to run an air conditioning system, or a combination of vehicle systems, in which case, the PCM 44 will not command an engine shutdown. When neither the PCM 44, nor a vehicle operator, requests an engine shutdown, the engine control routine is ended, as indicated in the block 54.

If an engine shutdown is requested—e.g., when the vehicle is operating, but the engine 12 is not needed to drive the vehicle, or when a vehicle operator turns the vehicle ignition switch to an off position—the engine control routine moves to step 56. In step 56 the PCM 44 determines whether a number of conditions have been met. For example, it may be first determined whether the engine position sensor correction factors are known. In the logic programmed into the PCM 44, this condition may be stated in the negative—i.e., the determination may be whether the correction factors are unknown. If the answer is yes, the engine control routine will continue; if the answer is no, and the correction factors are known, the engine control routine ends, see block 54.

One or more additional conditions may be tested by the PCM 44 before the engine control routine is allowed to continue. For example, the temperature of the battery 43 may be checked to determine whether or not it is at least as high as a predetermined temperature. This may be important, since a battery that is too cold may not be able to adequately power the motors 14, 38. In such a situation, the engine 12 would need to continue to supply power to the vehicle wheels 34 and/or other vehicle systems. Thus, the engine control routine would be ended, see block 54. Similarly, the PCM 44 may determine whether the voltage of the battery 43 is at least a predetermined voltage, and whether the discharge level of the battery 43 is at least a predetermined discharge level.

Additional conditions may be used, including a determination of whether a crankshaft position sensor, such as the sensor 46, is valid, and whether a camshaft position sensor 57 is valid. The PCM 44 can be programmed in accordance with the present invention such that all, or only some, of these conditions needs to be met to allow the engine control routine to continue. Moreover, the PCM 44 can be programmed with additional conditions to augment or replace some or all of the conditions mentioned above. When the PCM 44 determines that the appropriate conditions have been met, fuel to the engine 12 is discontinued. The PCM 44 may directly control the fuel supply to the engine 12, or it may indirectly control the fuel supply, for example, by communicating with an engine control unit (not shown).

After fuel to the engine 12 is discontinued, as illustrated in step 58, the PCM 44 then uses the motor 14 to spin the engine 12 at an approximately constant speed, see step 60. This facilitates determination of the engine position sensor correction factors by any convenient method, including those described in U.S. Pat. No. 5,117,681. Of course, the motor 14 can spin the engine 12 at a variable speed, as desired. For example, the motor 14 can spin the engine 12 according to a predetermined speed profile, in which the engine speed varies with time.

After the fuel to the engine 12 is discontinued, and the motor 14 spins the engine at some predetermined speed or speeds, the PCM 44 then makes two additional determinations. First, it is determined whether a predetermined time has passed, see step 62. This step is programmed into the PCM 44 to help ensure that the engine 12 does not remain in a defueled state indefinitely, when the correction factors are not determined. If the predetermined time has not passed, the PCM 44 then examines whether the correction factors have been determined, see step 64. If the correction factors have not been determined, the engine control routine loops back into step 60, and the motor 14 continues to spin the engine 12 at a constant speed.

Although steps 62 and 64 are shown sequentially in the flow chart 48 in FIG. 2, these steps may occur in reverse order, or even simultaneously, depending on how the engine control routine is programmed into the PCM 44. If the predetermined time has passed, or if the engine position sensor correction factors are determined, the PCM 44 then allows the engine speed to decrease to zero, see step 66. If the engine speed is allowed to go to zero because the predetermined time has passed, but the correction factors have not yet been determined, the PCM 44 can be programmed to store the information it gathered while the engine was spinning at constant speed. In this way, the next time engine shutdown is requested, the information previously stored in the PCM 44 will be available to augment new information gathered after fuel to the engine 12 is discontinued. This may speed up the process of determining the correction factors.

When the engine shutdown request is initiated by the driver who turns the ignition switch to the off position, the PCM 44 will command the motor 14 to spin the engine 12 with fuel discontinued for at least the predetermined time while the PCM 44 attempts to determine the correction factors. Thus, it may be desirable to set the predetermined time to a very small interval, so that the engine 12 does not continue to run for too long after the ignition switch is turned off.

Once the PCM 44 determines the correction factors, the engine control routine will still start, but it will end after step 52. This will continue until the keep-alive memory (KAM) is cleared and the correction factors need to be determined again. Alternatively, the correction factors could be stored in a non-volatile memory so that they are determined only once.

While the best mode for carrying out the invention has been described in detail, those familiar with the art to which this invention relates will recognize various alternative designs and embodiments for practicing the invention as defined by the following claims.

What is claimed is:

1. A method for controlling an engine in a vehicle having a motor operatively connected to the engine, the method comprising:
    determining when an engine shutdown is requested;
    determining whether an engine position sensor correction factor is known;
    discontinuing fuel to the engine if the engine position sensor correction factor is not known, and an engine shutdown is requested; and
    employing the motor to spin the engine after fuel to the engine is discontinued, thereby facilitating determination of the engine position sensor correction factor.

2. The method of claim 1, wherein the motor spins the engine at an approximately constant speed after fuel to the engine is discontinued.

3. The method of claim 1, wherein the engine shutdown is requested by the controller.

4. The method of claim 1, wherein the engine shutdown is requested by a vehicle operator.

5. The method of claim 1, further comprising allowing the engine speed to decrease to zero after the engine position sensor correction factor is determined.

6. The method of claim 1, further comprising allowing the engine speed to decrease to zero after a predetermined time has passed.

7. The method of claim 1, the engine including a camshaft and a crankshaft, the vehicle including a battery operatively connected to the motor, the method further comprising:
    determining whether at least some conditions from a set of conditions are met prior to discontinuing fuel to the engine, the set of conditions including a battery temperature being at least a predetermined temperature, a battery voltage being at least a predetermined voltage, a battery discharge level being at least a predetermined discharge level, a crankshaft position sensor being valid, and a camshaft position sensor being valid.

8. A system for controlling an engine in a vehicle to facilitate determination of engine position sensor correction factors, the vehicle including a motor operatively connected to the engine, the system comprising:
    a sensor configured to cooperate with the engine to detect engine position; and
    a controller in communication with the engine, the sensor, and the motor, the controller being configured to command an engine shutdown, determine whether the engine position sensor correction factors are known, discontinue fuel to the engine after engine shutdown is commanded and the engine position correction factors are not known, and command the motor to spin the engine after fuel to the engine is discontinued, thereby facilitating determination of the engine position sensor correction factors.

9. The system of claim 8, wherein the controller commands the motor to spin the engine at an approximately constant speed after fuel to the engine is discontinued.

10. The system of claim 8, wherein the controller is further configured to command engine shutdown during vehicle operation when the engine is not required.

11. The system of claim 8, wherein the controller is further configured to command engine shutdown when a vehicle operator turns a vehicle ignition switch to an off position.

12. The system of claim 8, wherein the controller is further configured to allow the engine speed to decrease to zero after the engine position sensor correction factors are determined.

13. The system of claim 8, wherein the controller is further configured to allow the engine speed to decrease to zero after a predetermined time has passed.

14. The system of claim 8, the engine including a camshaft and a crankshaft, the vehicle further including a battery operatively connected to the motor, and wherein the controller is further configured to determine whether at least some conditions from a set of conditions are met prior to discontinuing fuel to the engine, the set of conditions including a battery temperature being at least a predetermined temperature, a battery voltage being at least a predetermined voltage, a battery discharge level being at least a predetermined discharge level, a crankshaft position sensor being valid, and a camshaft position sensor being valid.

15. The system of claim 14, wherein the sensor configured to cooperate with the engine to detect engine position is the crankshaft position sensor.

16. A vehicle having a system for controlling an engine to facilitate determination of engine position sensor correction factors, the vehicle comprising:
- an engine;
- a motor operatively connected to the engine;
- a sensor configured to cooperate with the engine to detect engine position; and
- a controller in communication with the engine, the sensor, and the motor, the controller being configured to command an engine shutdown, determine whether the engine position sensor correction factors are known, discontinue fuel to the engine after engine shutdown is commanded and the engine position correction factors are not known, and command the motor to spin the engine after fuel to the engine is discontinued, thereby facilitating determination of the engine position sensor correction factors.

17. The vehicle of claim 16, wherein the controller commands the motor to spin the engine at an approximately constant speed after fuel to the engine is discontinued.

18. The vehicle of claim 16, wherein the controller is further configured to command engine shutdown during vehicle operation when the engine is not required.

19. The vehicle of claim 16, wherein the controller is further configured to command engine shutdown when a vehicle operator turns a vehicle ignition switch to an off position.

20. The vehicle of claim 16, wherein the controller is further configured to allow the engine speed to decrease to zero after the engine position sensor correction factors are determined.

21. The vehicle of claim 16, wherein the controller is further configured to allow the engine speed to decrease to zero after a predetermined time has passed.

22. The vehicle of claim 16, the engine including a camshaft and a crankshaft, the vehicle further comprising:

- a battery operatively connected to the motor; and

- wherein the controller is further configured to determine whether at least some conditions from a set of conditions are met prior to discontinuing fuel to the engine, the set of conditions including a battery temperature being at least a predetermined temperature, a battery voltage being at least a predetermined voltage, a battery discharge level being at least a predetermined discharge level, a crankshaft position sensor being valid, and a camshaft position sensor being valid.

23. The vehicle of claim 16, wherein the sensor configured to cooperate with the engine to detect engine position is the crankshaft position sensor.

* * * * *